No. 794,277.

Patented July 11, 1905.

UNITED STATES PATENT OFFICE.

WILLIAM B. BRAYTON, OF CLEVELAND, OHIO, ASSIGNOR TO THE BRAYTON WOODRUFF COMPANY.

CAR-WHEEL AND PROCESS OF MAKING SAME.

SPECIFICATION forming part of Letters Patent No. 794,277, dated July 11, 1905.

Application filed September 27, 1904. Serial No. 226,144.

*To all whom it may concern:*

Be it known that I, WILLIAM B. BRAYTON, a citizen of the United States, residing at Cleveland, in the county of Cuyahoga and State of Ohio, have invented a certain new and useful Improvement in Car-Wheels and Processes of Making the Same, of which the following is a full, clear, and exact description, reference being had to the accompanying drawings.

Car-wheels having steel tires are very desirable by reason of their wear-resisting power; but there has always been difficulty in effecting an efficient securement of the tire to the wheel-body. One method has been to shrink the tire onto the body; but this has resulted in the tire sometimes becoming hot in use from the application of the brake and expanding and working off the wheel-body. Another method has been to bolt the tire to the wheel-body; but this is expensive and the bolts in time wear loose.

The object of the present invention is to provide a method of securing the tire to the wheel-body which shall be cheap and efficient, resulting in remedying the defects of the present methods of shrinking the tire on or bolting it. I have found that if a small projecting rib is formed on the periphery of the wheel-body and a corresponding recess formed in the inner periphery of the tire, the tire, by being heated very much hotter than any heat it will ever attain in use, may be expanded sufficiently to slip into place over such rib and contracting will finally seat itself on the body with the rib occupying the recess. In order to insure the rib being entirely within the recess, I make the rib somewhat smaller than the recess, and thus when the tire shrinks into place there is no danger of the base of the rib and the recess resting on the face of the rib and straining the tire, as would result were the rib made a little too high or the recess a little too shallow.

My invention comprises such a method of making car-wheels and the car-wheel when thus constructed.

The invention is also more fully hereinafter explained and its definite characteristics set out in the claims.

Figure 1:
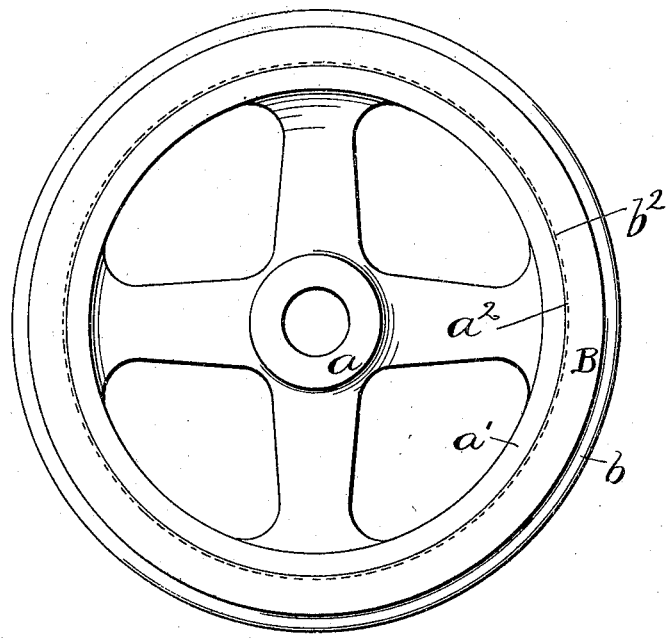
Figure 2:
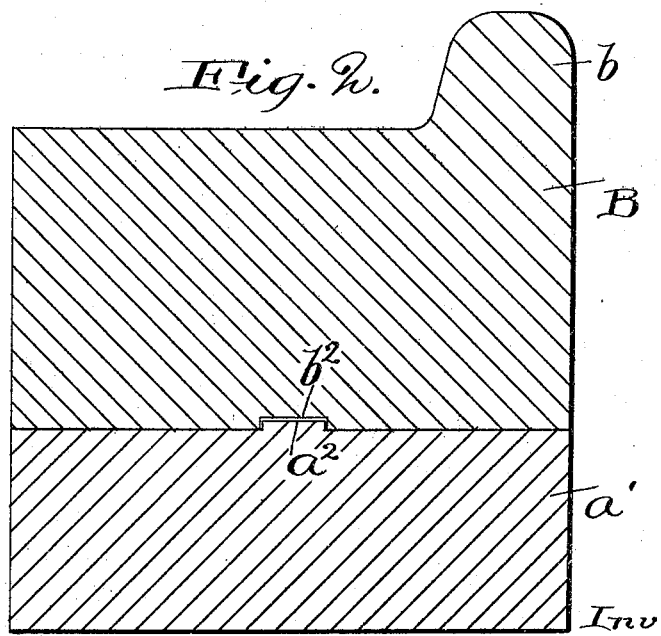

In the drawings, Figure 1 is a side elevation of my car-wheel, and Fig. 2 is an enlarged cross-section through the rim and tire thereof.

A represents the body of the wheel, which may comprise a hub $a$, a rim $a'$, and a suitable web or spokes $a^2$.

B represents the tire, having the usual flange $b$.

On the outer periphery of the rim $a'$, about midway between the edges thereof, is formed a projecting rib $a^2$. I have found in practice that this rib in ordinary-sized car-wheels may be conveniently made half an inch wide and of a height a little over a sixteenth of an inch. The rib has a cylindrical outer face and abrupt edges meeting the rim-face at right angles. In the inner periphery of the tire B is a groove $b^2$, which is somewhat deeper than the height of the rib $a^2$ and slightly wider than the width of that rib.

In making this wheel the parts are formed as described by any suitable tools and apparatus. Then the tire is heated approximately to a red heat and is passed over the periphery of the body and allowed to shrink into place. By making the rib $a^2$ smaller than the groove all danger of the tire resting on this rib, and thus straining itself when it contracts into place, is removed. This is an important point, for if the fit of the rib and groove is perfect any foreign matter resting on the rib or any want of accuracy in placing the tire would cause the tire to strain when it shrinks into place. It would shrink into place notwithstanding such improper connection, and the result would not be observable from the outside; but the tire would be under a constant strain and liable to rupture.

In the case of car-wheels, where human life depends on their reliability, it is very essential that there be no strains within the wheel which, while being unobservable, might result in its breakage at any time. The fit of the rib and groove is close enough to absolutely prevent the tire working off at the body, for it never in use becomes heated high enough to enable it to slide laterally across the rib.

I claim—

1. The process of making car-wheels consisting in forming a wheel-body with a rib on its outer periphery and a tire with a groove on its inner periphery, the rib being of less depth than the groove, in heating the tire and placing it around the body and allowing it to shrink into place.

2. The process of making car-wheels consisting in forming a wheel-body with a rib on its outer periphery and a tire with a corresponding groove on its inner periphery, the rib having a cylindrical face and abrupt edges and being of less depth and width than the groove, in heating the tire and placing it around the body and allowing it to shrink into place.

3. A car-wheel consisting of a body having a rib on its outer periphery and a metal tire surrounding the body, and having a groove on its inner periphery receiving the rib, the groove being of greater depth than the rib.

4. A car-wheel consisting of a body having on its outer periphery a rib with abrupt edges, and a metal tire surrounding the body and having a groove on its inner periphery receiving the rib, the groove being of greater depth and width than the rib.

5. In a car-wheel, in combination, a body having a rim portion with a cylindrical exterior on which there is formed a projecting rib having a cylindrical outer face, the rib rising from the periphery of the body only a short distance, and a metal tire surrounding said body and snugly embracing its cylindrical periphery except at the rib, whose cylindrical face it clears.

6. In a car-wheel, in combination, a body having a rim portion with a cylindrical exterior on which there is formed near the middle line a projecting rib having a cylindrical outer face and edges at right angles thereto, the rib rising from the periphery of the body only a small fraction of an inch, and a steel tire surrounding said body and snugly embracing its cylindrical periphery except at the rib, which it loosely surrounds.

In testimony whereof I hereunto affix my signature in the presence of two witnesses.

WILLIAM B. BRAYTON.

Witnesses:
ALBERT H. BATES,
B. W. BROCKETT.